(12) United States Patent
Huther

(10) Patent No.: US 7,644,806 B2
(45) Date of Patent: Jan. 12, 2010

(54) LOW LIFT TRUCK

(75) Inventor: Sebastian Huther, Kaltenkirchen (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 97 days.

(21) Appl. No.: 11/621,329

(22) Filed: Jan. 9, 2007

(65) Prior Publication Data
US 2007/0163842 A1 Jul. 19, 2007

(30) Foreign Application Priority Data
Jan. 14, 2006 (DE) .................. 20 2006 000 552 U

(51) Int. Cl.
*B66F 9/06* (2006.01)
*B66F 9/22* (2006.01)
*B62D 51/04* (2006.01)
*B62D 61/12* (2006.01)

(52) U.S. Cl. .................. 187/231; 187/234; 414/631; 180/19.1; 280/43.12

(58) Field of Classification Search .................. 187/224, 187/231, 234; 280/43.12; 180/54.1, 65.1, 180/65.6, 13, 19.1; 108/57.21; 414/631, 414/785, 495
See application file for complete search history.

(56) References Cited

U.S. PATENT DOCUMENTS

| 2,942,679 | A | * | 6/1960 | Gibson | 180/274 |
| 3,068,019 | A | * | 12/1962 | Ulinski | 280/103 |
| 3,181,640 | A | * | 5/1965 | Goodacre et al. | 180/19.2 |
| 3,465,841 | A | * | 9/1969 | Harshbarger et al. | 180/65.1 |
| 3,485,391 | A | * | 12/1969 | Johns | 414/545 |
| 3,486,333 | A | * | 12/1969 | Thomas | 60/394 |
| 3,507,350 | A | * | 4/1970 | Boyajian | 180/273 |
| 4,221,526 | A | * | 9/1980 | Crandall | 414/469 |
| 6,260,646 | B1 | * | 7/2001 | Fernandez et al. | 180/65.6 |
| 6,343,907 | B1 | * | 2/2002 | Schalmath | 414/495 |
| 2005/0247508 | A1 | * | 11/2005 | Gilliland et al. | 180/402 |

FOREIGN PATENT DOCUMENTS

DE 197 00 272 A1 7/1998
DE 103 34 937 A1 4/2005

OTHER PUBLICATIONS

Jungheinrich Elektro-Deischsel-Gabelhubwagen Ameise mit Fahrerstand Plattform Trangfahigkeit 2000 kg, published Mar. 1989. (Refer to p. labels to drawing on p. 3).

* cited by examiner

*Primary Examiner*—John Q. Nguyen
*Assistant Examiner*—Stefan Kruer
(74) *Attorney, Agent, or Firm*—Vidas, Arrett & Steinkraus, P.A.

(57) ABSTRACT

Low lift truck, with a load part, which has a load carrying means and is coupled with a drive part via a lift cylinder arrangement and a bar linkage for load wheels of the load carrying means, a steered drive wheel, which forms with a drive motor a drive unit, which is rotatably bearing mounted around a vertical axis by the frame of the drive part, a drawbar, pivotable in the drive part around a horizontal and a vertical axis, which is in a driving connection with the drive unit, an hydraulic power pack for the hydraulic lift cylinder arrangement, and a battery casing, connected with the load part, whereby the drive motor is a wheel hub motor and the battery casing (34) is disposed above the drive unit.

8 Claims, 8 Drawing Sheets

LOW LIFT TRUCK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Low lift trucks as industrial trucks have typically a load part and a drive part. The load part contains a load carrying means, mostly in the form of two parallel spaced wheel arms, which are supported on the front ends by load wheels The load wheels are bearing mounted in rocking arms, which can be swivelled about a relatively small predetermined lift with the aid of a bar linkage when the wheel arms are lifted. The load part is guided on the drive part and is lifted about the described lift with the aid of an arrangement of hydraulic cylinders in the drive part, wherein a bar linkage coupled with the drive part provides for that upon lifting the wheel arms, the rocking arm of the load wheels is extended at the same time by the bar linkage in the wheel arms.

It is known to realise such low lift trucks as operator accompanied vehicles and to use a drawbar for steering. The drawbar is pivotally bearing mounted around a horizontal and a vertical axis and in a driving connection with the drive unit, which in turn is pivotally bearing mounted around a vertical axis in the frame of the drive part. The drive unit drives the driving wheel, which is the steered wheel at the same time. It is known to arrange the steered wheel either centrally on the longitudinal axis or also laterally offset with respect to the same. A hydraulic power pack supplies the lift cylinder arrangement with hydraulic fluid. The drive motor is battery driven, and the arrangement of the battery is provided in a battery casing, in which case it is known to realise the battery casing as a part of the load part and to lift it at the same time when the load part is lifted. Usually the battery sits on that side of the drive part which faces the wheel arms, through which the length of the vehicle is determined by the length of the drive part and the battery casing, irrespective of the wheel arms.

The drive unit is often realised such that the drive motor is arranged on the upper side of a bearing part by which the drive wheel is rotatably bearing mounted around the vertical axis in the frame. The coupling between the drive motor and the axis of the wheel takes place via a bevel gear system. From DE 103 34 937 A1, the entire contents of which is corporated herein by reference, it is also known to use a wheel hub drive motor. A wheel hub drive motor decreases the expenditure for a gear.

From DE 197 00 272 A1, the entire contents of which is incorporated herein by reference, it has become known to dispose a battery block in a drawbar-guided industrial truck between the steerable driving wheel and a second wheel, which is disposed in the transverse direction of the industrial truck in a distance. In doing so, the drive wheel is disposed eccentrically. With the aid of the known industrial truck, a higher stiffness as well as well as a smaller dimension in the longitudinal direction is to be achieved. In such an industrial truck, the drawbar is also disposed eccentrically. However, the known industrial truck is not related to a low lift truck, but to a high lift truck with a lifting scaffold.

The present invention is based on the objective to provide a drawbar-guided low lift truck which has a particularly small dimension in the axis direction without additional construction expenditure.

BRIEF SUMMARY OF THE INVENTION

In the low lift truck according to the present invention, the drive motor is a per se known wheel hub motor. The battery casing is disposed above the drive unit In the low lift truck according to the present invention, the length of the vehicle is substantially determined by the length of the casing for the battery, neglecting the wheel arms. A certain length is still required for the attachment. However, as an alternative it is also possible to articulate the drawbar on the upper side of the battery casing, through which the length of this vehicle region is decreased still further.

By the arrangement of the relatively high situated battery, the centre of gravity of the vehicle is moved to the upside, which results in a stronger tilting tendency However, this drawback can be compensated by a modern running gear tuning without great effort.

In the low lift truck according to the present invention, according to one embodiment, the drive unit can be disposed on the longitudinal axis of the low lift truck According to a further embodiment of the invention, it is provided that the vertical pivot axis of the drawbar is approximately in that plane through which runs the longitudinal axis of the low lift truck.

In a further embodiment of the invention, it is provided that two lift cylinders are provided on that outer side of the battery casing which faces the drawbar at each one end of the outer side at a time. The laterally disposed hydraulic cylinders have the advantage that the drawbar can engage centrally on the axis transverse to the travel direction, which is optimal for the space layout The steering ratio can be dimensioned such that the drawbar has to perform only a small steering stop in order to effect a maximum steering deflection of the steered wheel. The steering stop is limited by the lateral lift cylinder.

According to a further embodiment of the invention, it is provided that the piston rods of the hydraulic cylinders point to the downside and are fixedly connected with the frame of the drive part, while the cylinder shells are connected with the battery casing and the hydraulic power pack is also mounted on the outside on the battery casing in the vicinity of one of the two hydraulic cylinders Through this, an immediate communication with the hydraulic power pack can take place at one hydraulic cylinder without a conduit between The other hydraulic cylinder has to be supplied via a hydraulic conduit, which is not subject to any movement, however, and thus can be installed fixedly.

Between the drawbar and its pivotal bearing, respectively, and a bearing assembly part for the drive wheel, a suitable gear is provided in order to effect a swivelling of the drive unit. For this purpose, one embodiment of the invention provides that a first sprocket wheel is fixed with the axis of the pivotal bearing of the drawbar and a second sprocket on the bearing assembly part of the drive unit, and a drive chain is wound around both sprockets Thus, the ratio of the teeth of the sprockets determines the steering ratio.

Fork lift trucks have become known which have a wheel arm lift as well as a mast lift This means that besides to the wheel arms, which can perform a so-called free lift, an additional load carrying means is provided which can be guided with the aid of a more or less high mast, in order to lift the load to a greater height than this would be the case with the free lift. Through this, the second load carrying means can take over stacking duties. The industrial truck according to the present invention can be also realised as a lifting truck with a stacking function. Therefore, one embodiment of the invention provides that lateral mast profile structures are provided for the guidance and actuation of another load carrying means, wherein drive means, like lift cylinders e.g., for the second load carrying means are also laterally disposed. Even in doing so, the overall length of the vehicle can be reduced by the invention

BRIEF DESCRIPTION OF SEVERAL VIEWS OF THE DRAWINGS

The present invention will describe in more detail by means of drawings in the following, in which an example of its realisation is shown.

DETAILED DESCRIPTION OF THE INVENTION

Figure 1:
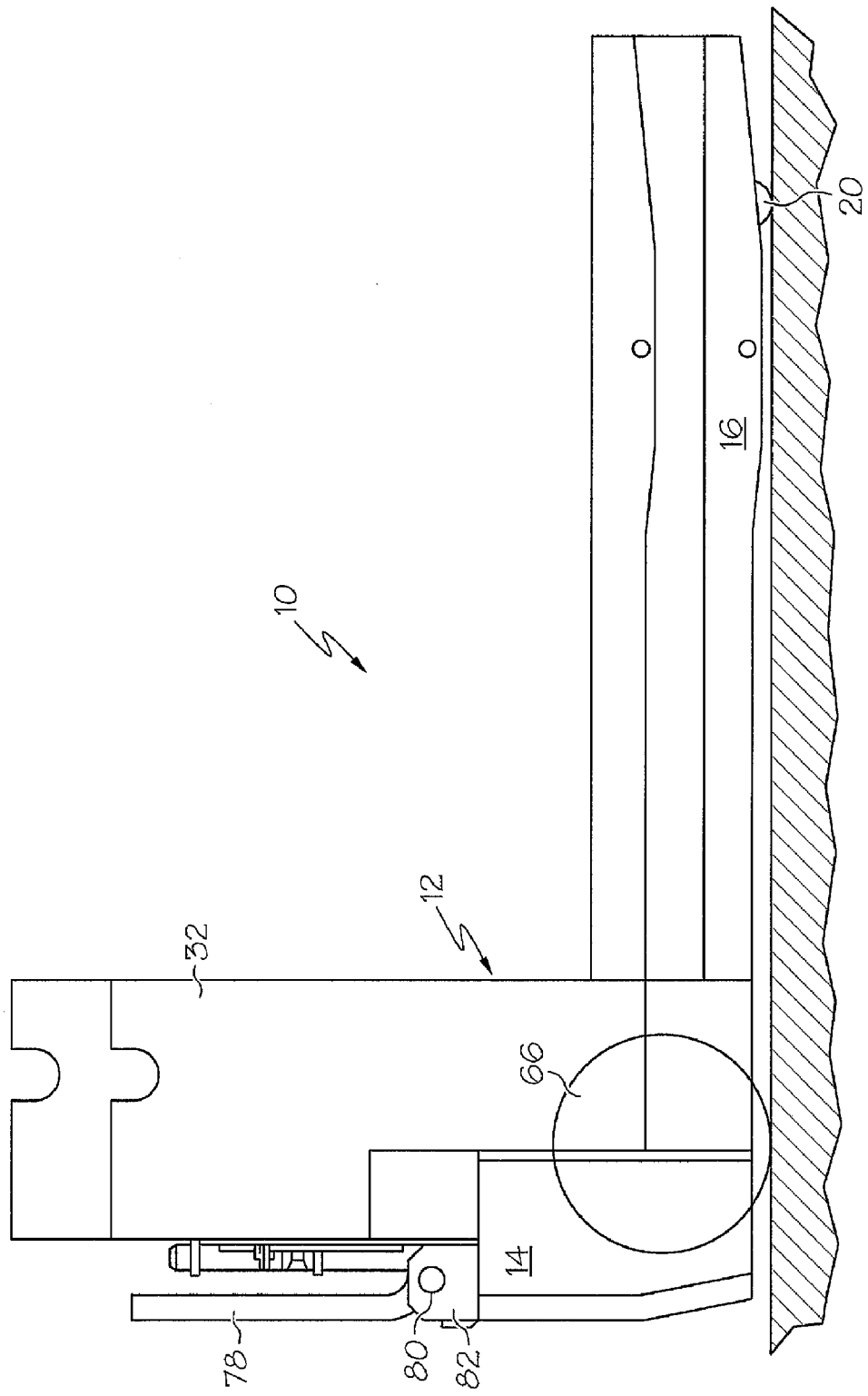
FIG. 1 shows schematically the side view of a low lift truck according to the invention

While this invention may be embodied in many different forms, there are described in detail herein a specific preferred embodiment of the invention. This description is an exemplification of the principles of the invention and is not intended to limit the invention to the particular embodiment illustrated In the figures, a low lift truck 10 is represented with a load part 12 and a drive part 14. The load part has two wheel arms 16, 18, which have load wheels 20, 22 on their front ends, which are bearing mounted in rocking arms 24, 26.

Figure 2:
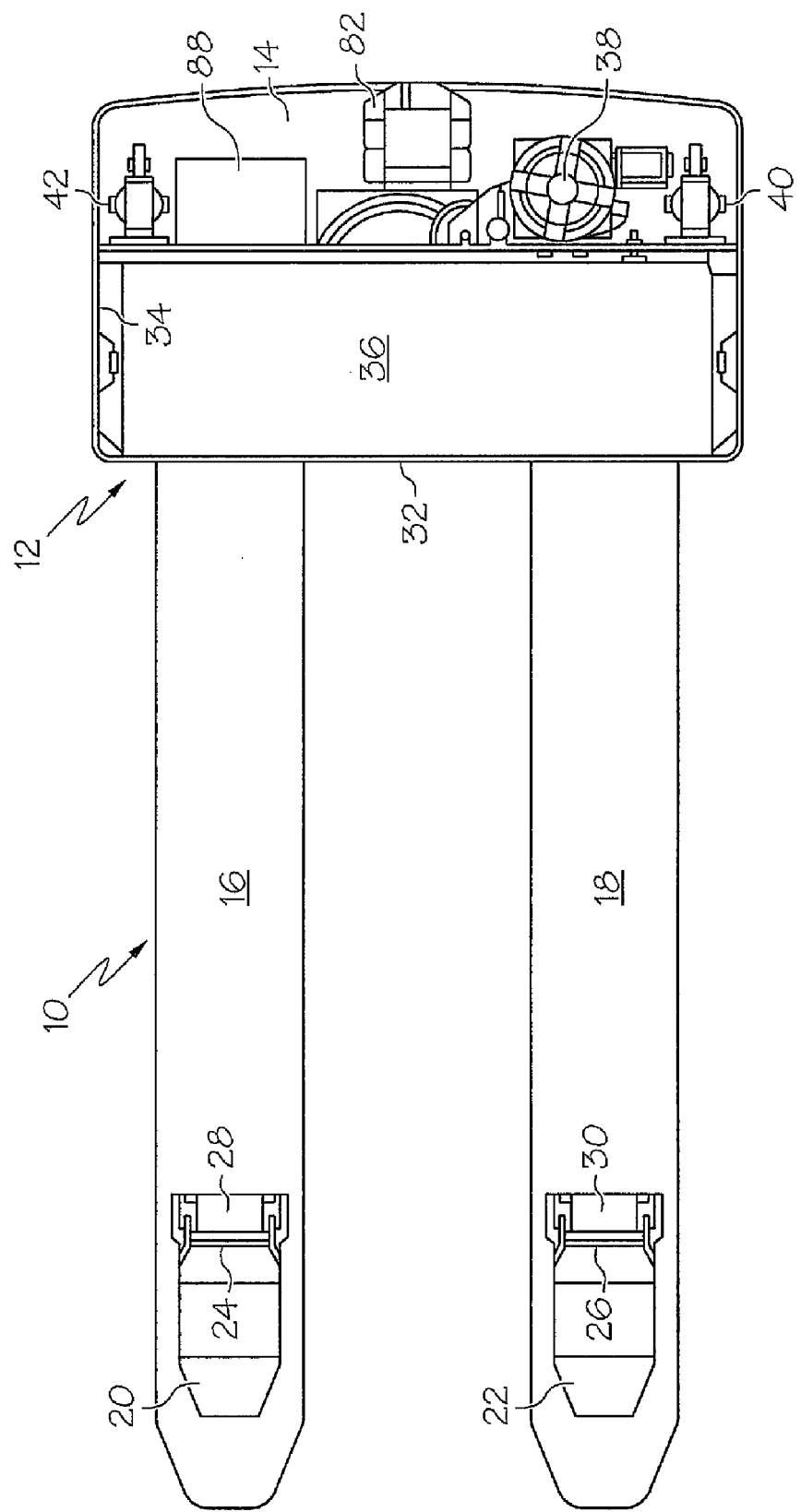
FIG. 2 shows the top view of the low lift truck according to FIG. 1.

As can be recognised in FIG. 2, the rocking arms are each at a time coupled with one rod 28 or 30, respectively, for swivelling the rocking arm and thus for advancing the load wheels 20, 22 A casing 32 is connected with the wheel arms 16, 18, which forms a battery casing 34 in its upper region to accommodate a battery 36.

Figure 3:
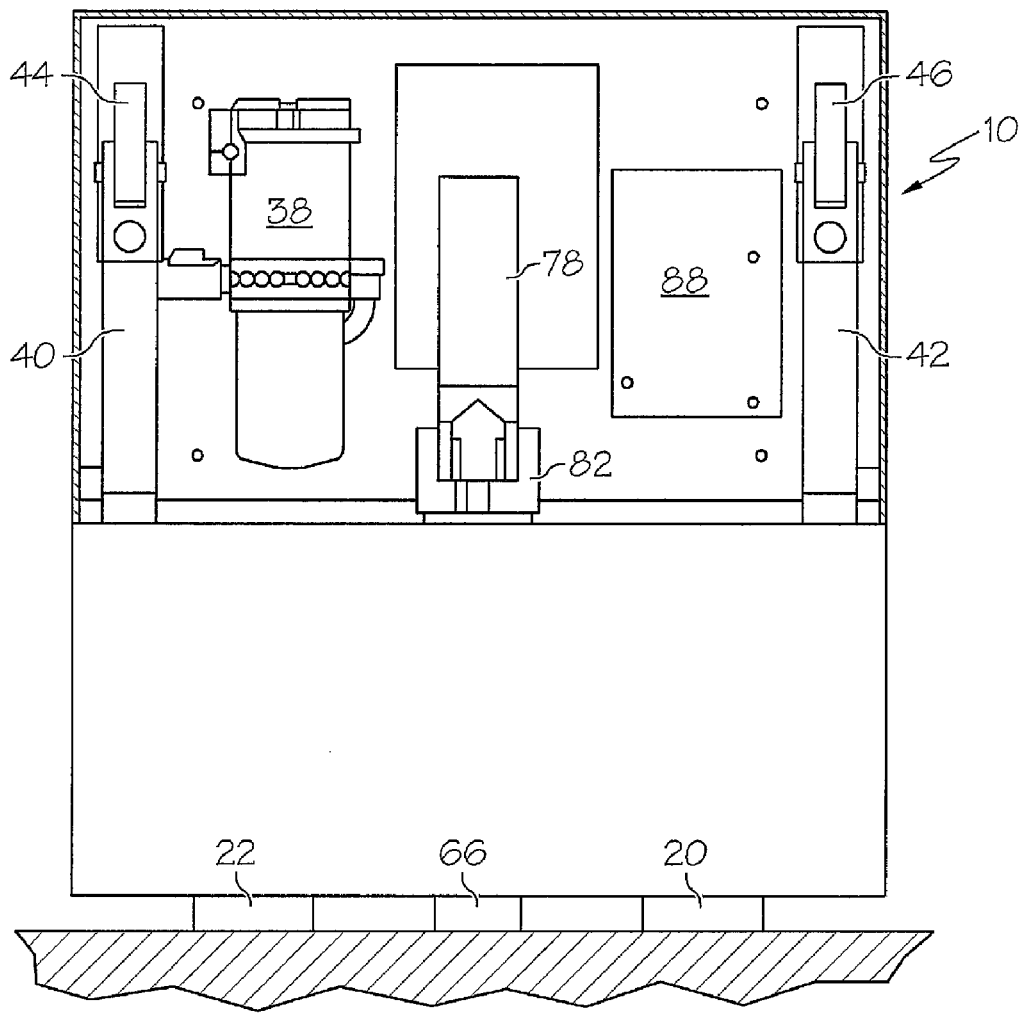
FIG. 3 shows the rear view of the low lift truck according to FIG. 1.
Figure 4:
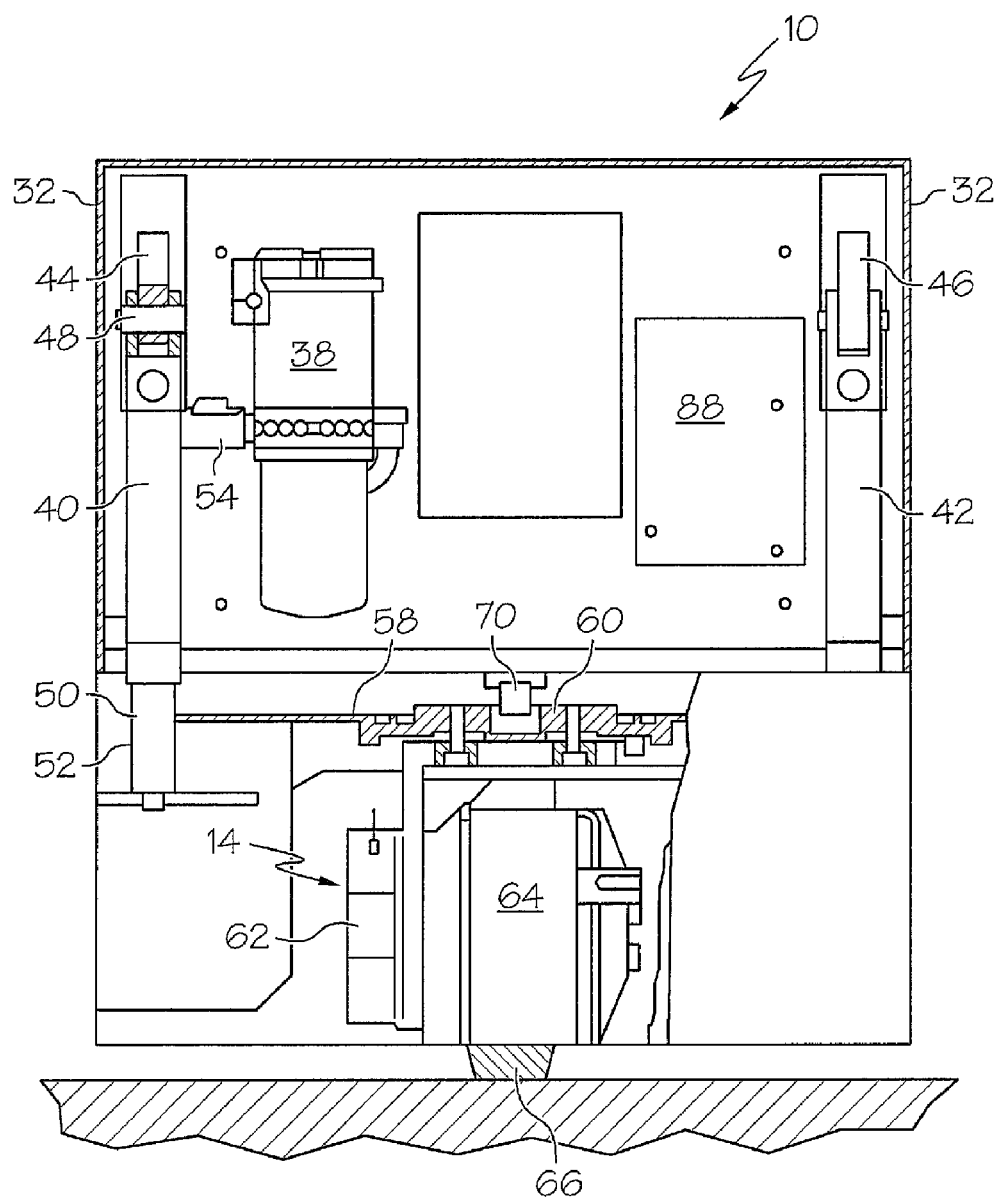
FIG. 4 shows a similar view as FIG. 3, partially cut open

On the rear wall of the battery casing 34, a hydraulic power pack 38 is fixedly attached laterally offset to the longitudinal axis. As can be seen from FIGS. 3 and 4, two vertical hydraulic cylinders 40, 42 are disposed on the rear wall of the battery casing 34 The cylinder shell of the hydraulic cylinders 40, 42 points to the upside and is articulated on one cantilever 44 and 46 at a time, respectively, on the rear wall of the battery casing 34, via a bolt 48. At 50, the piston rod of the hydraulic cylinder 40 can be recognised, which sits fixedly in a sleeve 52, which is fastened in the not further described frame of the drive part 14. The hydraulic power pack 38 is in the vicinity of the cylinder 40, so that an immediate connection 54 without a conduit there between can take place. The hydraulic cylinder 42 is connected to the hydraulic power pack 38 via a fixed conduit. When the hydraulic cylinders 40, 42 are extended, the casing 32 is lifted in total, together with the wheel arms 16, 18. Via a not shown bar linkage, which is only indicated at 56 in FIG. 6, the rods 28, 30 in the wheel arms 16, 18 are coupled with the drive part. Through this, the rods 28, 30 are actuated and extend the load wheels 20, 22; the latter remain in ground contact in the proceeding lifting of the wheel arms 16, 18 and support them As can be seen from FIGS. 4, 5 and 6, a bearing assembly part 60 is rotatably bearing mounted around a vertical axis in a plate 58 of the frame of the drive part 14. The bearing part 60 has a bearing leg 62 directed to the downside, on which a drive wheel 66 is bearing mounted together with a wheel hub motor 64. It is located approximately on the longitudinal axis of the low lift truck 10 A wheel hub motor is per se known and will therefore not be described in more detail.

A sprocket 70 is unrotatably disposed centrally in an opening of the bearing assembly part 60 Another sprocket 72 sits unrotatably on a spigot 74, which is rotatably mounted in a sleeve 76, which is fixedly connected with the frame of the drive part 14. The spigot 74 forms a bearing assembly part for a drawbar indicated at 78, which is also horizontally movable bearing mounted around a horizontal spigot 80. A chain 78 is wound around the sprockets 70, 72 (see FIG. 5), so that upon swivelling the drawbar 78 around the vertical axis, the drive wheel 66 is swivelled. The bearing pedestal for the horizontal spigot 80 is designated with 82 It sits on a shoulder of the casing for the drive part 14.

On the right side of the rear wall of the battery casing 34, seen from the drawbar 78, a box 88 is disposed, which contains a control device.

Figure 5:
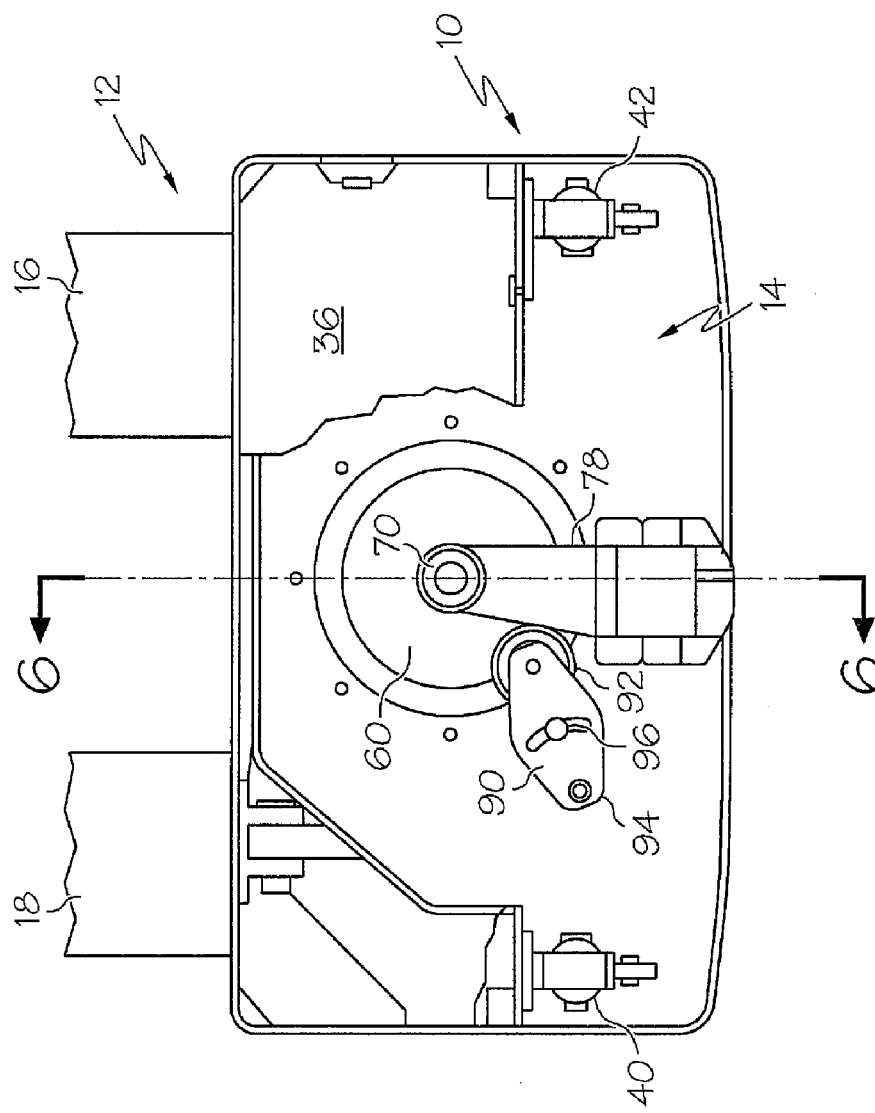
FIG. 5 shows a similar view as FIG. 2, but with a partially broken up portion.
Figure 6:
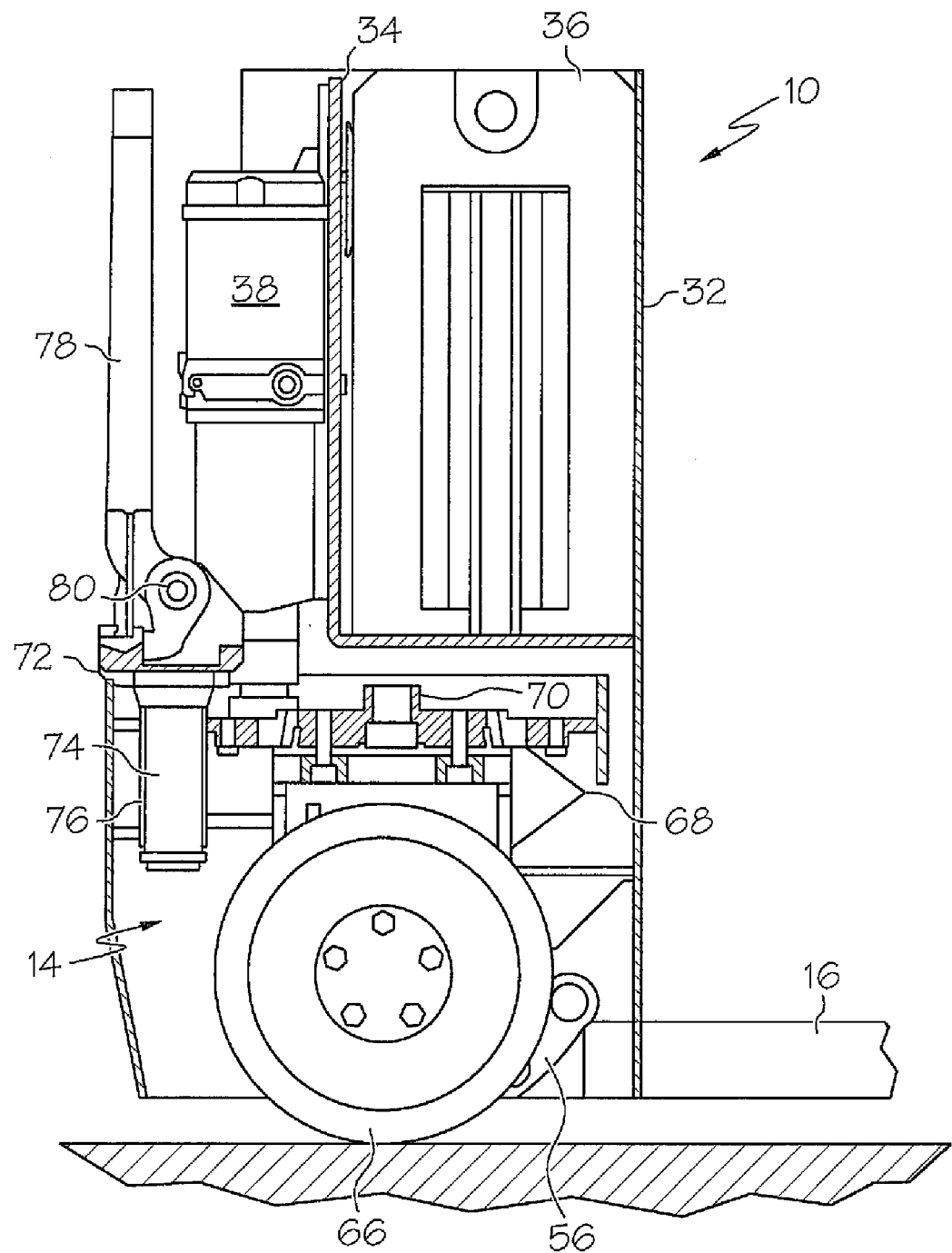
FIG. 6 shows a cut through FIG. 5 along the line 6-6.

In FIG. 5, a lever 90 can be recognised, which bears a wheel 92 on one end and is pivotal on the other end at 94, in order to apply a tension on the chain 78 with the aid of the wheel 92. The angle position of the lever 90 is fixed by a screw 96, which sits in a bow-shaped slit of the lever 90.

From the representation according to FIG. 1 in particular, it can be seen that the length of the low lift truck is substantially determined by the length of the battery casing 32, 34 The battery is situated approximately centrally in the height of the transverse axis of the vehicle, which is located in a plane through which the axis of the drive wheel 66 runs The width of the battery or the battery casing 34, respectively, extends over the complete width of the drive part. The maximum pivot angle of the drawbar 78 is determined by the position of the lift cylinders 40, 42, but is to be regarded as sufficient, in particular when a sufficient gear ratio step-up takes place via the sprockets 70, 72.

Figure 7:
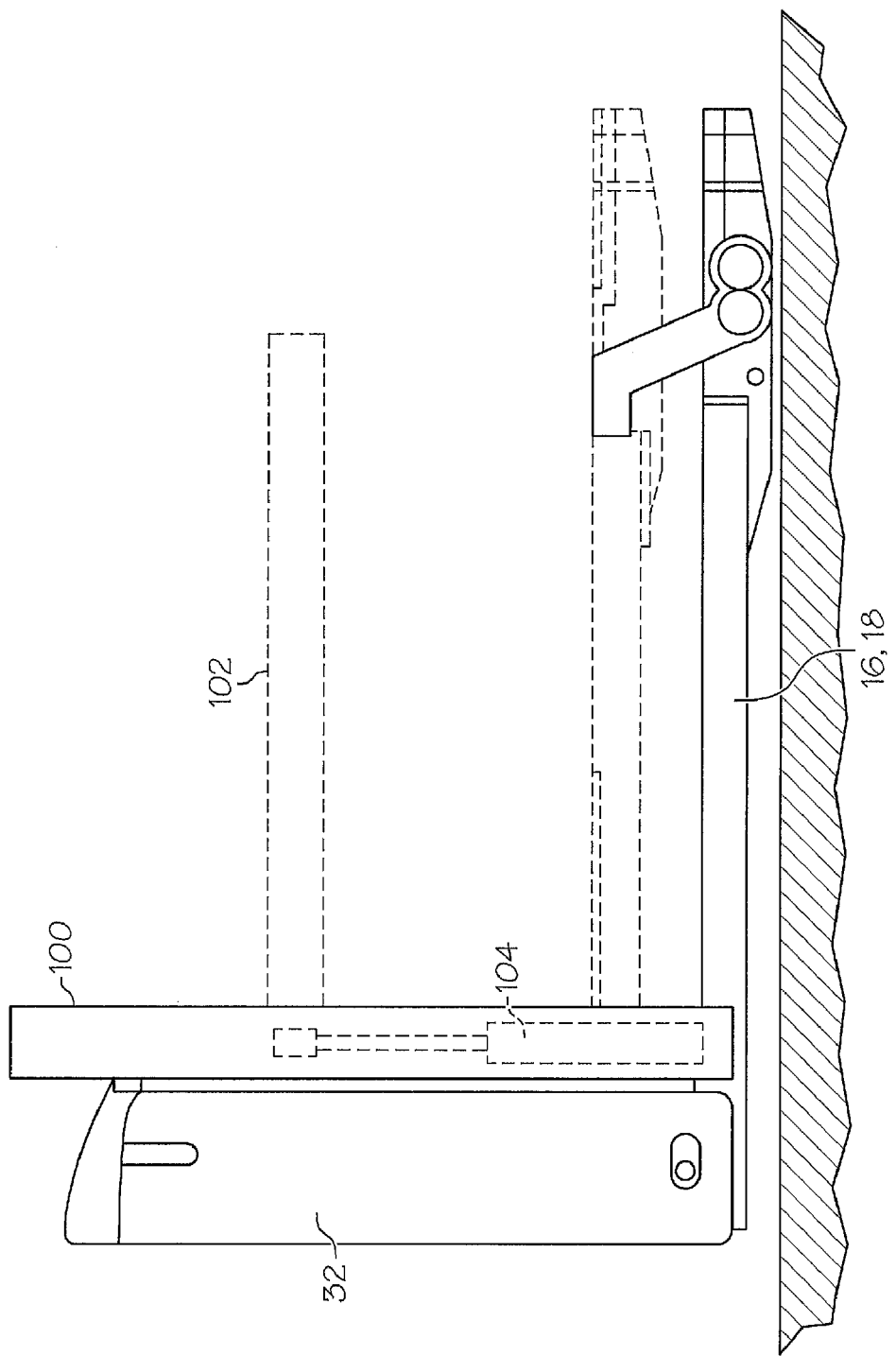
FIG. 7-FIG. 9 shows diagrammatically a low lift truck with an additional load support means.
Figure 8:
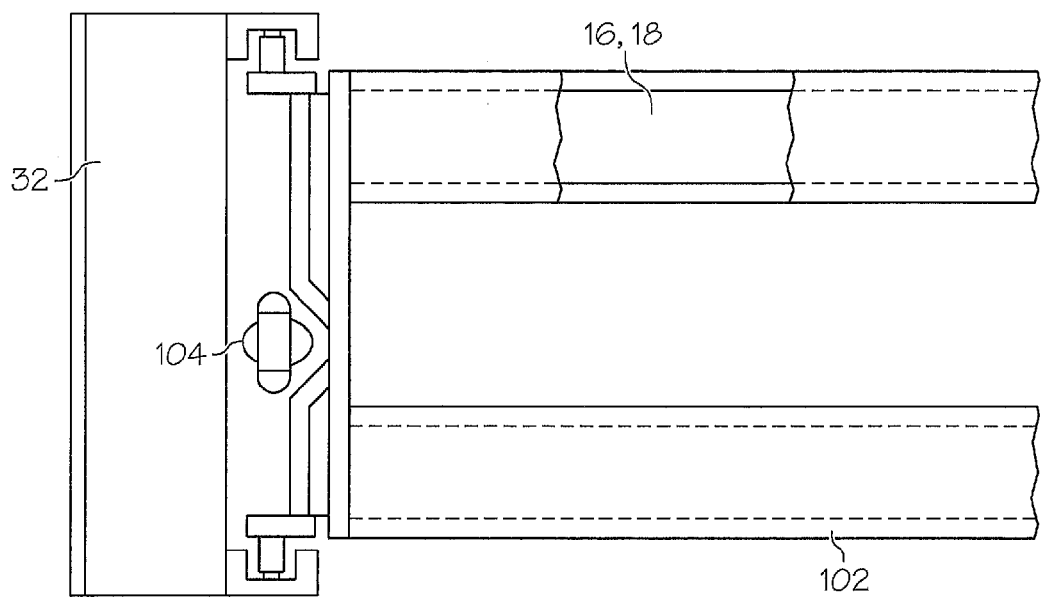
Figure 9:
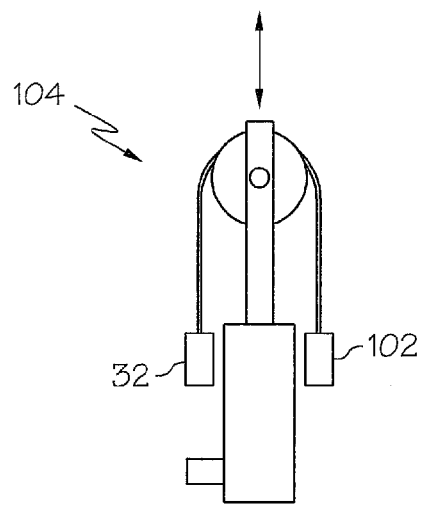

It can be seen in FIG. 7-FIG. 9 that laterally of housing 32 a mast structure 100 is mounted for a load fork 102. The load fork 102 is actuated by lifting cylinders 104. This actuation is conventional. The wheel arms 16, 18 are also shown in lifted state by dotted lines.

What is claimed is:

1. Low lift truck, with a load part, which has a load carrying means and is coupled with a drive part via a hydraulic lift cylinder arrangement and a bar linkage for load wheels of the load carrying means, a steered drive wheel, which forms with a drive motor a drive unit, which is rotatably bearing mounted around a vertical axis by a frame of the drive part, a drawbar, pivotable in the drive part around a horizontal and a vertical axis, which is in a driving connection with the drive unit, a hydraulic power pack for the hydraulic lift cylinder arrangement, and a battery casing, connected with the load part, characterised in that the drive motor (64) is a wheel hub motor, the battery casing (34) is disposed directly vertically above the drive unit (14) and the power pack (38) is attached to the battery casing at an elevation above the drive unit.

2. Low lift truck according to claim 1 having a longitudinal axis, characterised in that the drive unit (64) is disposed on the longitudinal axis of the low lift truck.

3. Low lift truck according to claim 1, characterised in that the vertical pivot axis of the drawbar (78) is approximately in a plane which runs through the longitudinal axis of the low lift truck.

4. Low lift truck according to claim 1, characterised in that two lift cylinders (40, 42) are provided on an outer side of the battery casing that faces the drawbar (78) wherein said lifting cylinders are mounted on opposite ends of the outer side.

5. Low lift truck according to claim 1, characterised in that a first sprocket wheel (72) sits unrotatably on a spigot (74) which is rotatably mounted on a sleeve (76) and a second sprocket wheel sits on a spigot, which in turn sits unrotatably in a central opening of a bearing assembly part (60) for the drive unit, and a drive chain (78) is wound around the sprocket wheels (72, 70).

6. Low lift truck according to claim 1, further including a second load carrying means (102), the second load carrying means (102) guided and actuated by a lateral mast profile structure (100) and lateral drive means (104).

7. Low lift truck according to claim 4, the lift cylinders (40, 42) further including piston rods (5), characterised in that the piston rods (50) of the lift cylinders (40, 42) point downwardly and are fixedly connected with a frame of a drive wheel (66), wherein each of the lift cylinders has a shell, wherein each shell is connected with the battery casing (34) and the hydraulic power pack (38) is also attached to the battery casing (34) proximal one of the lift cylinders (40, 42).

8. Low lift truck according to claim 6 wherein the drive means (104) are hydraulic lift cylinders.

* * * * *